United States Patent [19]

Kennedy

[11] 4,107,867
[45] Aug. 22, 1978

[54] CATFISH TRAP

[76] Inventor: Benton B. Kennedy, Gen Delivery, Allemand, La. 70030

[21] Appl. No.: 802,220

[22] Filed: May 31, 1977

Related U.S. Application Data

[63] Continuation-in-part of Ser. No. 622,928, Oct. 16, 1975, abandoned.

[51] Int. Cl.² .............................................. A01K 69/06
[52] U.S. Cl. ............................................ 43/65; 43/100
[58] Field of Search .................................... 43/100, 65

[56] References Cited

U.S. PATENT DOCUMENTS

| 363,858 | 5/1887 | Steward | 43/65 |
|---|---|---|---|
| 1,453,135 | 4/1923 | Hermanson | 43/100 |
| 3,271,894 | 9/1966 | Manno et al. | 43/65 |

Primary Examiner—Louis G. Mancene
Assistant Examiner—Daniel J. Leach
Attorney, Agent, or Firm—James B. Lake, Jr.

[57] ABSTRACT

An elongated slatted box having oppositely disposed ends, one of which is open and the other closed. A pair of internal frames, one mounted in said open end and the other spaced longitudinally therefrom, both the frames having flexible splines fastened thereto to converge inwardly to define concentric, spaced apart and progressively constricted passageways into respectively contiguous compartments of the slatted box. The size of the interior opening of the first and outer constricted passageway limits the size of all the fish entering the trap as to largeness, and the size and spacing of the interior opening of the second and inner constricted passageway relative to the first constriced constricted passageway restricts the fish entering therethrough to catfish only and of a desired size only.

1 Claim, 3 Drawing Figures

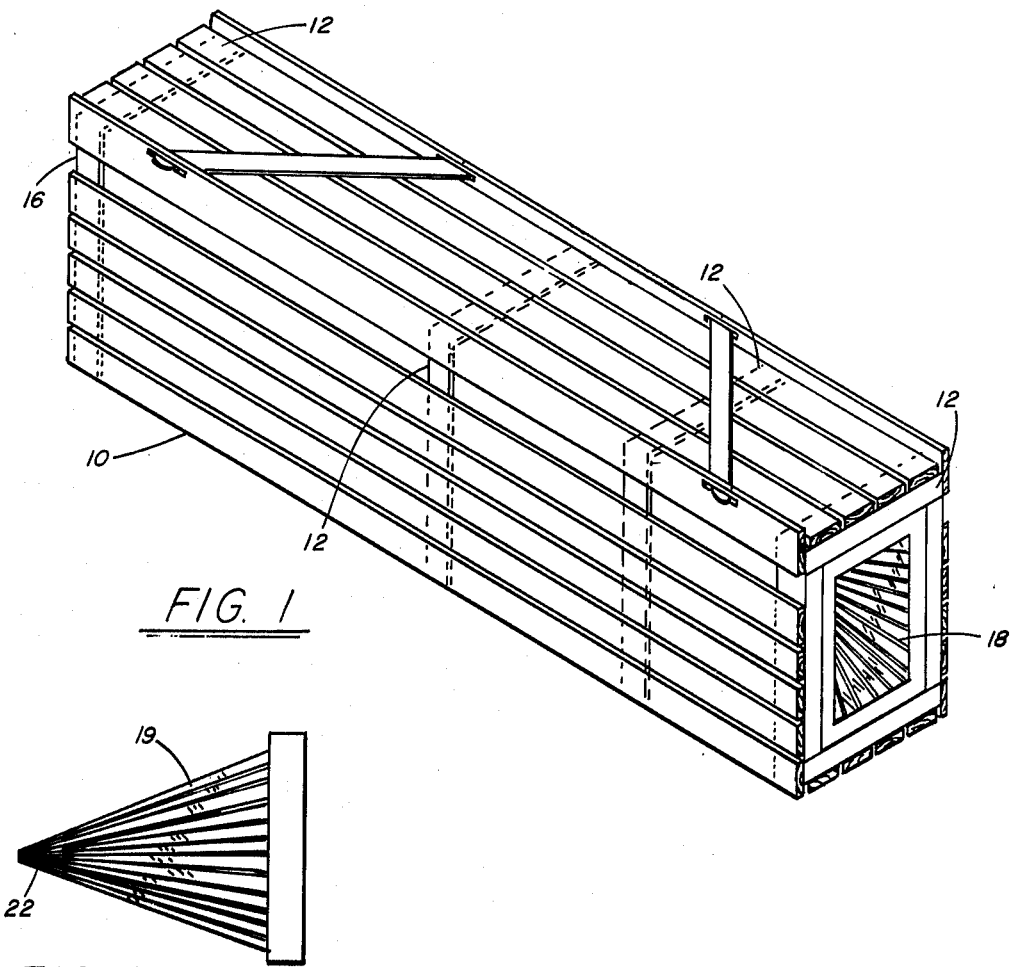
FIG. 1
FIG. 2
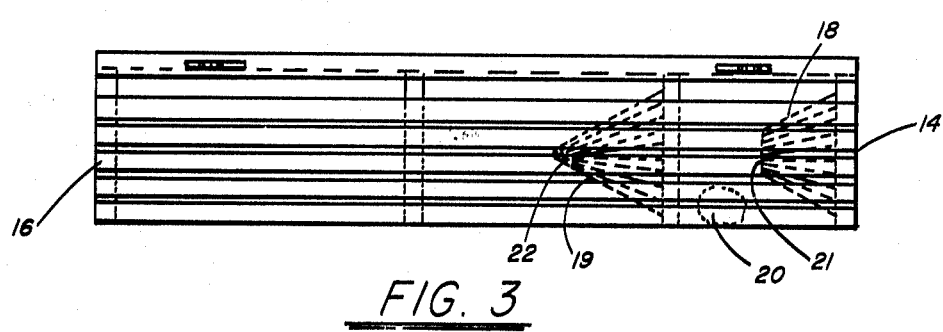
FIG. 3

CATFISH TRAP

BACKGROUND OF THE INVENTION

This is a continuation-in-part of my pending application, Ser. No. 622,928, filed Oct. 16, 1975, now abandoned, for a catfish trap.

The invention relates generally to fish traps and more particularly to catfish traps for trapping catfish of a desired size only.

The prior art teaches double open ended and slatted lobster traps, fish traps of wire or other netting, all with conconcentric and converging entering passageways, some in succession and defined by flexible splines. The traps are non-discriminating.

SUMMARY OF THE INVENTION

It is an object of the invention to provide a fish trap that will trap catfish only and of a desired size only.

Another object of the invention is to provide a catfish trap that has a converging succession of entrance passageways strong enough to withstand would-be predators, is flexible enough to allow fish into the trap but not out, and tough enough to withstand contact with fish over an extended period of time.

BRIEF DESCRIPTION OF THE SEVERAL VIEWS OF THE DRAWINGS

FIG. 1 is a three dimensional view from above and to the side of an entrance end of the invention, FIG. 2 is a side elevation of a converging passageway showing spline construction, and FIG. 3 is a side elevation of the invention showing the relative positions of passageways, the relative configurations thereof, and the spacing therebetween.

DETAILED DESCRIPTION

Referring to FIGS. 1-3, the invention comprises an elongated slatted box 10 having transverse frames 12 and oppositely disposed ends 14 and 16. End 14 is open with converging splines 18 fixed to frame 12 bounding said open end 14, the frame being beveled and the splines tapered to define an inwardly extending passageway converging to an exit 21 a little smaller than the size of the desired catfish. Splines 18 are preferably made of a smooth, flexible plastic such as "Lexan", a product of General Electric Co., which is tough and strong. A following frame 12 is spaced from the end frame 12 a distance equivalent to the length of a catfish from the point of contact with splines 18, defining exit 21, to the eyes of said catfish. Less of a bevel and longer splines 19 distinguish a second inwardly extending passageway converging from following frame 12 to a second exit 22, smaller than exit 21. Taken together, the end and following frames 12, with their respectively converging splines, define inner and outer passageways between which bait 20 is placed. Exit 22 defines a space equal to the space between slats, and splines 18 and 19 are tapered to be respectively longitudinally opposed as they converge to define close-sided passageways.

A game fish will not go through a close-sided passageway too small for it to get through without touching the close sides of the outer passageway and will back out; the others will swim through the outer passageway but only the ones small enough to go through exit 22 will pass through the inner passageway and they can swim out through the slats which are spaced apart the size of the exit. The others will swim out of exit 21. The catfish on the other hand will surge forward when touched behind the gills when his head is through exit 21 and this surge will carry him into the inner passageway with longer splines and a lesser bevel, and thus more flexible to open from a smaller exit 22 to let the catfish through. Larger catfish will back out of the outer passageway without getting past exit 21, and smaller ones will swim back out, not having been touched in the outer passageway to cause it to surge into the inner passageway. Thus the catfish trap can be used in inland and fresh water where trapping game fish is not allowed.

Heretofore wood has been used to make splines 18 and 19, but when flexible enough to permit the easy entrance of fish into the trap, the wood has proven too thin to withstand abrasive contact with entering fish over a period of time, and too weak to prevent predators from breaking them. In addition to the advantages stated, the use of plastic for making splines has resulted in the unexplained increase in the catch during times of light fish runs when the size of the catch is most important to a working fisherman.

What is claimed is:

1. A catfish trap for catching catfish only of a desired size and comprising:
   a. an elongated box defined by spaced apart slats, and having an open end for the entrance of fish therein;
   b. an outer passageway converging inwardly from said open end to a round exit sized to lightly engage the desired size catfish at their respective largest transverse dimensions, said outer passageway being defined by short tapered plastic splines mounted around said open end and opposed in length to define closed sides; and
   c. an inner passageway converging to relatively smaller round second exit having a diameter of the same size as the spacing between slats, and defined by longer tapered and thus more flexible plastic splines than those of said outer passageway mounted in said elongated box and spaced inwardly from said exit of said outer passageway a distance less than the average length of the desired size of catfish, said inner passageway being easily expandable by said catfish by its passage therethrough into a fish retaining part of said slatted box, but not out, whereby only catfish sized to lightly touch the exit of said outer passageway are finally trapped and all the other fish of the same size and all larger fish do not enter the box, and smaller fish swim out.

* * * * *